W. H. MILES, Jr.
Lather Brush Handle.
No. 9,746. Reissued June 7, 1881.
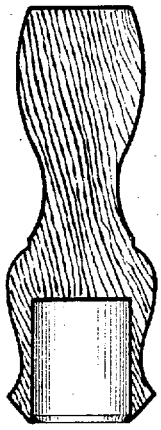
Attest:
H. L. Perrine
L. W. Seely
Inventor.
William H. Miles Jr.
By. Ellis Spear
Atty.
N. PETERS, Photo-Lithographer, Washington, D. C.

UNITED STATES PATENT OFFICE.

WILLIAM H. MILES, JR., OF BROOKLYN, NEW YORK.

LATHER-BRUSH HANDLE.

SPECIFICATION forming part of Reissued Letters Patent No. 9,746, dated June 7, 1881.

Original No. 144,553, dated November 11, 1873. Application for reissue filed March 19, 1879.

*To all whom it may concern:*

Be it known that I, WILLIAM H. MILES, Jr., of the city of Brooklyn, in the county of Kings and State of New York, have invented a new and useful Improvement in Lather-Brush Handles and Ferrules, of which the following is a specification, reference being had to the accompanying drawing.

The object of my invention is to produce a good and durable lather-brush handle out of one piece of wood, with a coating of ordinary preparation of Japan varnish or enamel over the entire handle and socket, inside and out, so that it shall not only be impervious to water, but shall be the stronger by the process. The object, further, is to form a bead for holding the bristles more securely by means of the same coating of varnish or enamel.

The accompanying drawing represents a longitudinal section of such a lather-brush handle.

In carrying out my invention I form the socket and handle from wood of one piece, turned or otherwise reduced to a proper shape and size, and hollowed out for a suitable distance for the reception of the hair or bristles. I then cover this handle, including the inside of the socket, with Japan varnish or enamel by immersing it in the varnish or enamel, or by other convenient methods. Then it is usually allowed to drain, with the socket end down, by which a bead is formed from the substance of the coating around the inside of the mouth of the socket. A sufficient number so treated are then placed in an oven and subjected to a temperature sufficient to harden the japan or enamel. This process is repeated several times until a smooth hard surface is produced. By this process the handle is thoroughly seasoned and prevented from warping or cracking, and the first and second coatings permeate the pores of the material of the handle and toughen and strengthen the whole handle. Then the hair or bristles are introduced into the socket, and the bead previously formed by the drip at the inside of the mouth of the socket secures them more firmly than in any other brush, for when the ends of the hair or bristles are saturated with cement (the usual process) and put into the socket the inserted end expands in the enlarged space above the bead, and as the cement hardens the bead holds the hair or bristles in the handle.

Having thus described my invention, what I claim, and desire to secure by Letters Patent, is—

1. A handle for brushes, made of wood and coated with Japan varnish or enamel, said varnish or enamel forming a bead about the mouth of the socket, substantially as described.

2. As a new article of manufacture, a lather-brush handle with a socket for the bristles formed of one piece of wood and coated with Japan varnish or enamel.

WM. H. MILES, JR.

Witnesses:
JAS. H. GAW,
FRED. FAIRTHORNE.